(12) United States Patent
Botkin et al.

(10) Patent No.: US 8,065,844 B2  
(45) Date of Patent: Nov. 29, 2011

(54) BALLASTED PHOTOVOLTAIC MODULE AND MODULE ARRAYS

(75) Inventors: Jonathan Botkin, El Cerrito, CA (US); Simon Graves, Berkeley, CA (US); Matt Danning, Oakland, CA (US)

(73) Assignee: Sunpower Corporation, San Jose, CA (US)

(*) Notice: Subject to any disclaimer, the term of this patent is extended or adjusted under 35 U.S.C. 154(b) by 109 days.

(21) Appl. No.: 12/492,640

(22) Filed: Jun. 26, 2009

(65) Prior Publication Data

US 2009/0320904 A1 Dec. 31, 2009

Related U.S. Application Data

(60) Provisional application No. 61/076,475, filed on Jun. 27, 2008.

(51) Int. Cl.
  *E04D 13/18* (2006.01)
  *H01L 31/042* (2006.01)
(52) U.S. Cl. ........ 52/173.3; 136/251; 136/244; 126/623
(58) Field of Classification Search ................ 52/173.3, 52/745.19, 747.1; 136/230, 251, 244; 126/623, 126/704; 248/910, 237, 346.01
  See application file for complete search history.

(56) References Cited

U.S. PATENT DOCUMENTS

| 4,196,720 | A | * | 4/1980 | ElDifrawi et al. | 126/570 |
| 4,226,256 | A | * | 10/1980 | Hawley | 136/244 |
| 4,378,006 | A | * | 3/1983 | Hawley | 126/569 |
| 4,421,943 | A |  | 12/1983 | Withjack |  |
| 4,677,248 | A | * | 6/1987 | Lacey | 136/244 |
| 5,316,592 | A |  | 5/1994 | Dinwoodie |  |
| 5,497,587 | A | * | 3/1996 | Hirai et al. | 52/173.3 |
| 5,571,338 | A |  | 11/1996 | Kadonome et al. |  |
| 6,105,316 | A | * | 8/2000 | Bottger et al. | 52/173.3 |
| 6,201,181 | B1 | * | 3/2001 | Azzam et al. | 136/244 |

(Continued)

FOREIGN PATENT DOCUMENTS

DE 10 2006 026 297 83 8/2007

(Continued)

OTHER PUBLICATIONS

Sunlink Corporation, brochure entitled "PV Module Mounting System for Flat Roofs & Ground Mounts"; © 2000-2007; 12 pgs.

(Continued)

*Primary Examiner* — Brian Glessner
*Assistant Examiner* — Babajide Demuren
(74) *Attorney, Agent, or Firm* — Blakely, Sokoloff, Taylor & Zafman LLP

(57) ABSTRACT

A photovoltaic (PV) module assembly including a PV module and a ballast tray. The PV module includes a PV device and a frame. A PV laminate is assembled to the frame, and the frame includes an arm. The ballast tray is adapted for containing ballast and is removably associated with the PV module in a ballasting state where the tray is vertically under the PV laminate and vertically over the arm to impede overt displacement of the PV module. The PV module assembly can be installed to a flat commercial rooftop, with the PV module and the ballast tray both resting upon the rooftop. In some embodiments, the ballasting state includes corresponding surfaces of the arm and the tray being spaced from one another under normal (low or no wind) conditions, such that the frame is not continuously subjected to a weight of the tray.

25 Claims, 12 Drawing Sheets

U.S. PATENT DOCUMENTS

| | | | |
|---|---|---|---|
| 6,570,084 B2 | 5/2003 | Dinwoodie | |
| 6,606,823 B1 | 8/2003 | McDonough et al. | |
| 6,617,507 B2 | 9/2003 | Mapes et al. | |
| 6,672,018 B2 | 1/2004 | Shingleton | |
| 6,703,555 B2 * | 3/2004 | Takabayashi et al. | 136/244 |
| 6,803,515 B2 * | 10/2004 | Itoyama et al. | 136/251 |
| 6,809,251 B2 | 10/2004 | Dinwoodie | |
| 6,809,253 B2 | 10/2004 | Dinwoodie | |
| 7,155,870 B2 | 1/2007 | Almy | |
| 7,178,295 B2 | 2/2007 | Dinwoodie | |
| 7,297,866 B2 | 11/2007 | Aschenbrenner | |
| 2003/0094193 A1 * | 5/2003 | Mapes et al. | 136/244 |
| 2004/0128923 A1 | 7/2004 | Moulder et al. | |
| 2005/0126621 A1 | 6/2005 | Dinwoodie et al. | |
| 2006/0053706 A1 | 3/2006 | Russell | |
| 2006/0090789 A1 * | 5/2006 | Thompson | 136/246 |
| 2006/0196128 A1 * | 9/2006 | Duke | 52/173.3 |
| 2007/0151594 A1 | 7/2007 | Mascolo et al. | |
| 2009/0113822 A1 * | 5/2009 | Patrina et al. | 52/173.3 |

FOREIGN PATENT DOCUMENTS

| | | |
|---|---|---|
| EP | 2 031 324 A2 | 3/2009 |
| JP | 2006274591 A1 | 10/2006 |
| NL | 1029160 | 1/2005 |
| WO | 2007/079382 A2 | 7/2007 |
| WO | 2008/108909 A1 | 9/2008 |

OTHER PUBLICATIONS

Sunlink brochure entitled "PV Module Mounting System"; undated; 4 pgs.

Sunpower Corporation brochure entitled "T10 Solar Roof Tile"; available at www.sunpowercorp.com; 2 pgs.

* cited by examiner

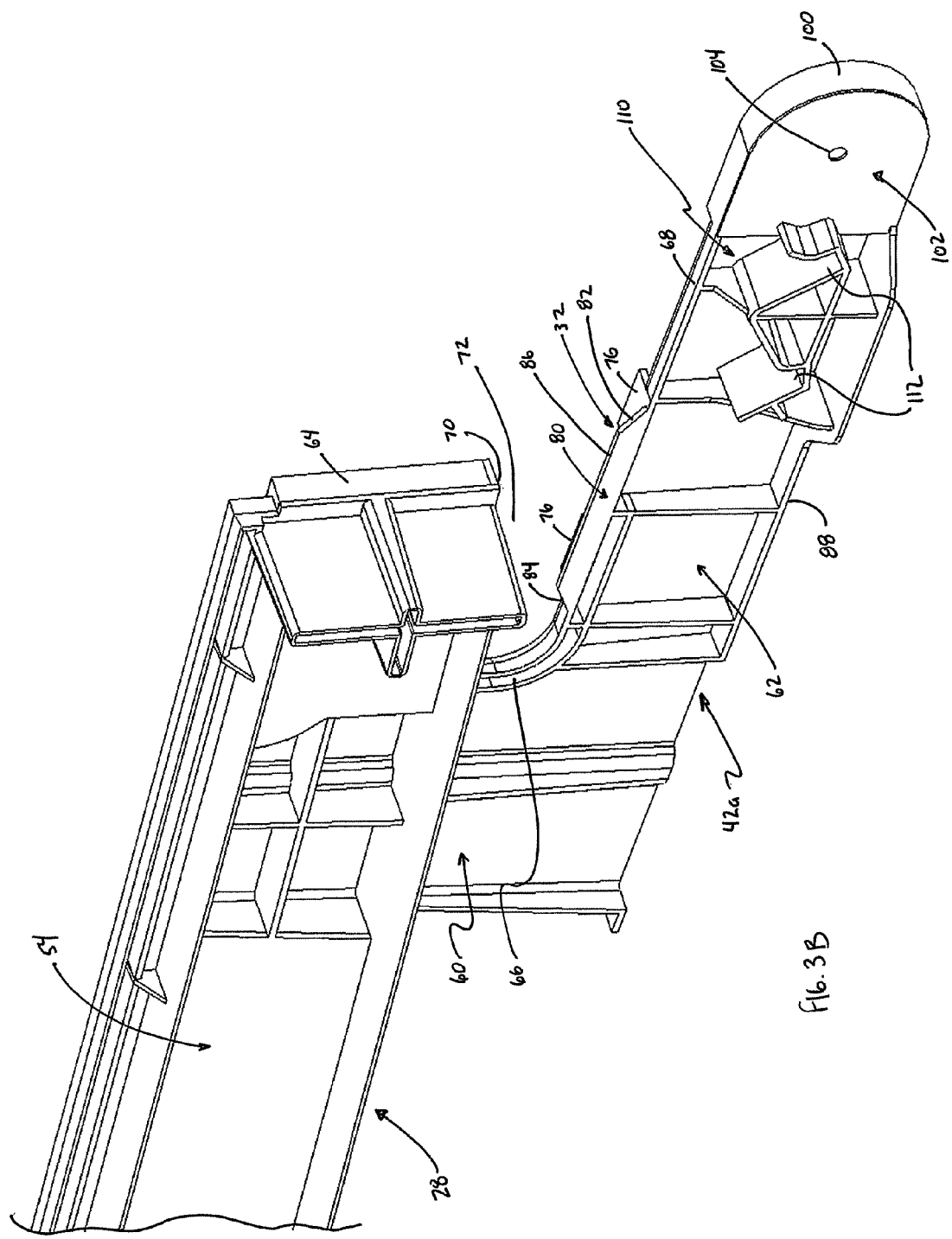

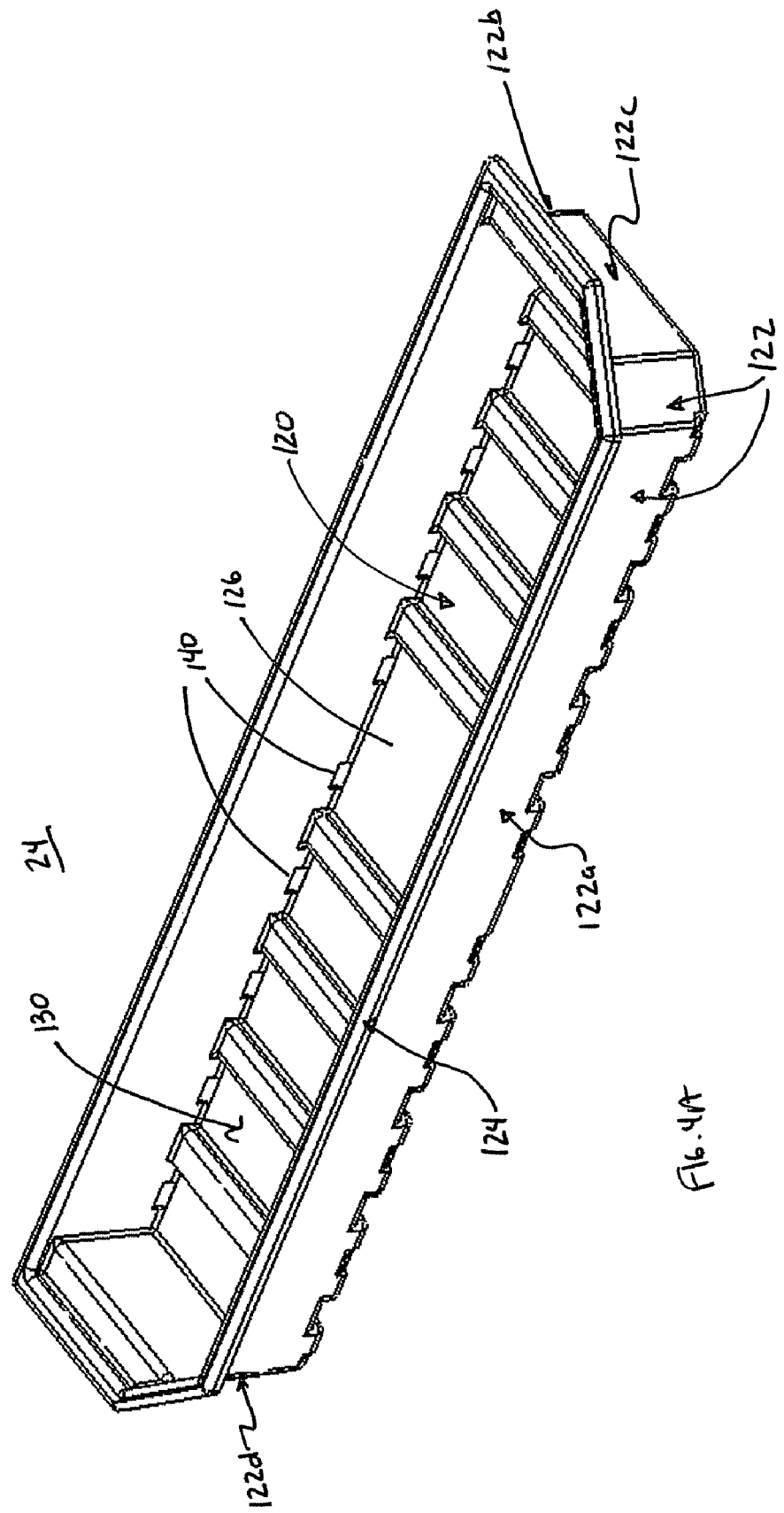

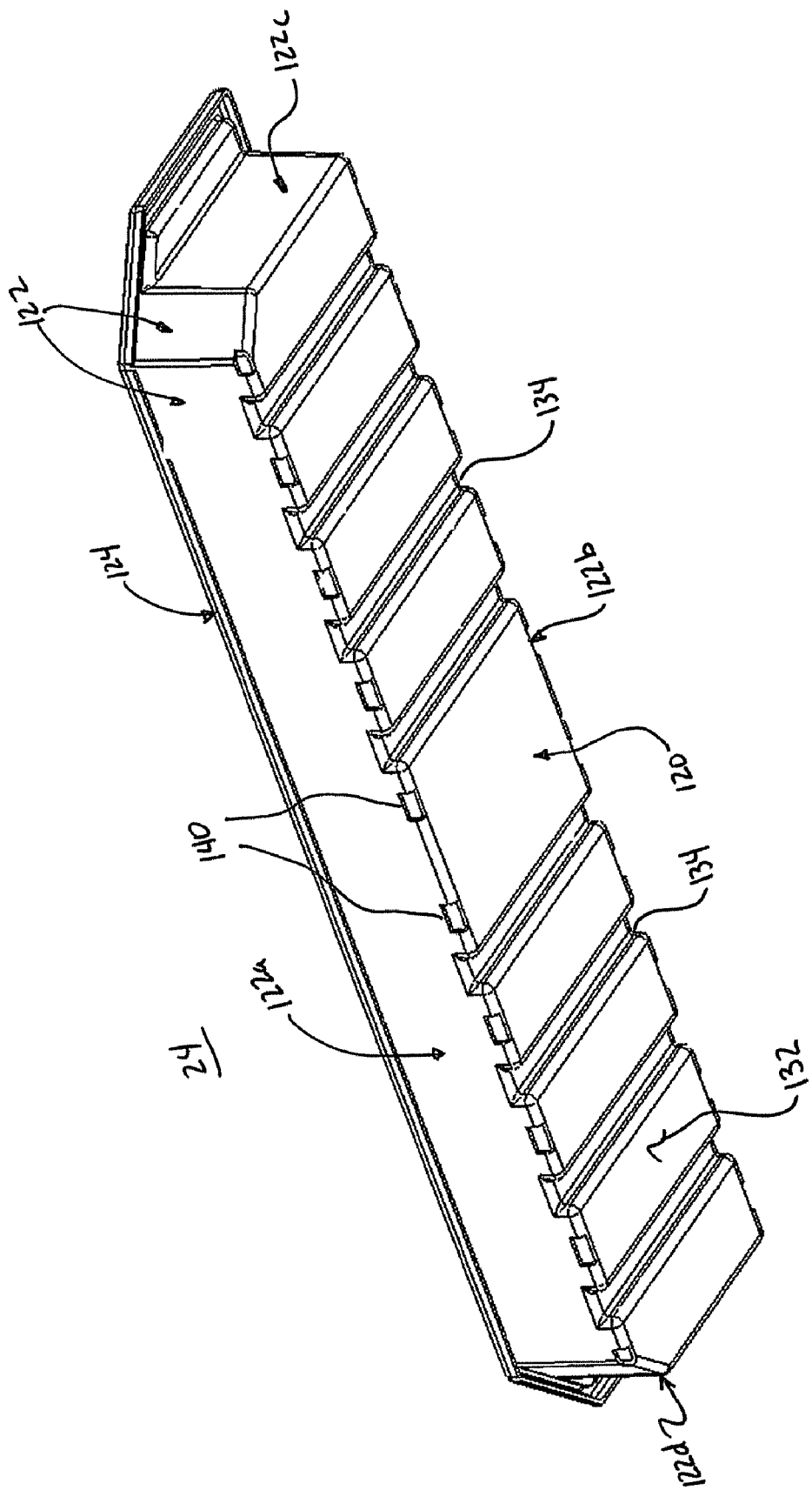

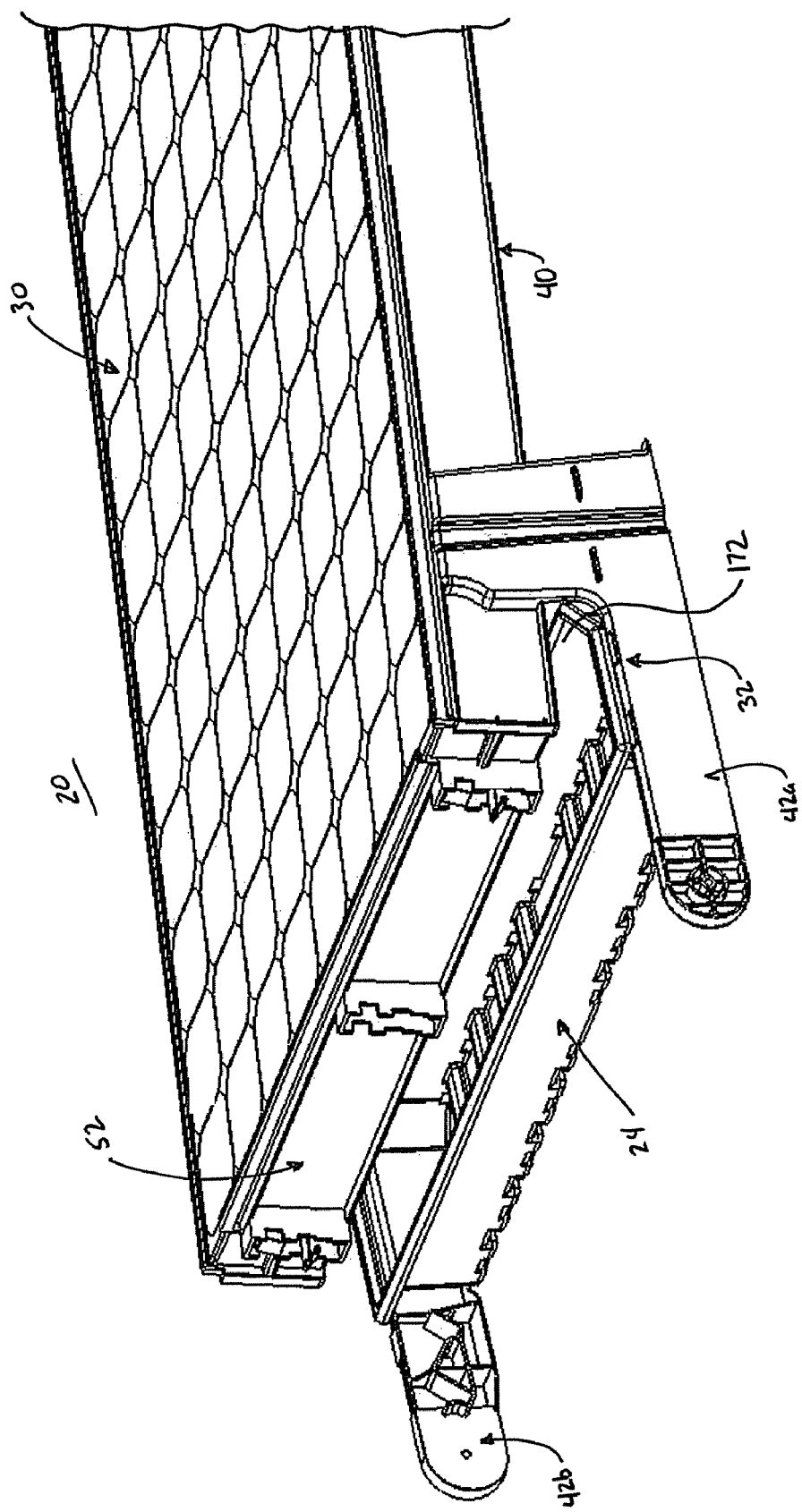

BALLASTED PHOTOVOLTAIC MODULE AND MODULE ARRAYS

PRIORITY DATA

This application claims priority under 35 U.S.C. §119(e)(1) to U.S. Provisional Patent Application Ser. No. 61/076,475, filed Jun. 27, 2008, entitled "Ballasted Photovoltaic Module and Module Arrays", and the entire teachings of which are incorporated herein by reference.

CROSS-REFERENCE TO RELATED APPLICATIONS

This application also relates to U.S. application Ser. No. 61/076,479 entitled "Photovoltaic Module Kit Including Connector Assembly for Non-Penetrating Array Installation" U.S. application Ser. No. 61/076,486 entitled "Photovoltaic Module with Removable Wind Deflector" U.S. application Ser. No. 61/076,492 entitled "Photovoltaic Module and Module Arrays" and U.S. application Ser. No. 61/076,497 entitled "Photovoltaic Module with Drainage Frame" all of which were filed on even date herewith and the teachings of each of which are incorporated herein by reference.

STATEMENT REGARDING FEDERALLY SPONSORED RESEARCH OR DEVELOPMENT

This invention was made with Government support under Contract No. DE-FC36-07GO17043 awarded by the United States Department of Energy. The Government has certain rights in this invention.

BACKGROUND

The present disclosure relates to solar roof tiles. More particularly, it relates to photovoltaic module assemblies including a selectively implemented ballast device.

Solar power has long been viewed as an important alternative energy source. To this end, substantial efforts and investments have been made to develop and improve upon solar energy collection technology. Of particular interest are industrial- or commercial-type applications in which relatively significant amounts of solar energy can be collected and utilized in supplementing or satisfying power needs.

Solar photovoltaic technology is generally viewed as an optimal approach for large scale solar energy collection, and can be used as a primary and/or secondary (or supplemental) energy source. In general terms, solar photovoltaic systems (or simply "photovoltaic systems") employ solar panels made of silicon or other materials (e.g., III-V cells such as GaAs) to convert sunlight into electricity. More particularly, photovoltaic systems typically include a plurality of photovoltaic (PV) modules (or "solar tiles") interconnected with wiring to one or more appropriate electrical components (e.g., switches, inverters, junction boxes, etc.). The PV module conventionally consists of a PV laminate or panel generally forming an assembly of crystalline or amorphous semiconductor devices electrically interconnected and encapsulated. One or more electrical conductors are carried by the PV laminate through which the solar-generated current is conducted.

Regardless of an exact construction of the PV laminate, most PV applications entail placing an array of PV modules at the installation site in a location where sunlight is readily present. This is especially true for commercial or industrial applications in which a relatively large number of PV modules are desirable for generating substantial amounts of energy, with the rooftop of the commercial building providing a convenient surface at which the PV modules can be placed. As a point of reference, many commercial buildings have large, flat roofs that are inherently conducive to placement of a PV module array, and is the most efficient use of existing space. While rooftop installation is thus highly viable, certain environment constraints must be addressed. For example, the PV laminate is generally flat or planar; thus, if simply "laid" on an otherwise flat rooftop, the PV laminate may not be optimally positioned/oriented to collect a maximum amount of sunlight throughout the day. Instead, it is desirable to tilt the PV laminate at a slight angle relative to the rooftop (i.e., toward the southern sky for northern hemisphere installations, or toward the northern sky for southern hemisphere installations). Further, possible PV module displacement due to wind gusts must be accounted for, especially where the PV laminate is tilted relative to the rooftop as described above.

In light of the above, conventional PV module installation techniques have included physically interconnecting each individual PV module of the module array directly with, or into, the existing rooftop structure. For example, some PV module configurations have included multiple frame members that are physically attached to the rooftop via bolts driven through (or penetrating) the rooftop. While this technique may provide a more rigid attachment of the PV module, it is a time-consuming process and permanently damages the rooftop. Also, because holes are formed into the rooftop, distinct opportunities for water damage arise. More recently, PV module configurations have been devised for commercial, flat rooftop installation sites in which the arrayed PV modules are self-maintained relative to the rooftop in a non-penetrating manner. More particularly, the PV modules are interconnected to one another via a series of separate, auxiliary components. Ballast is mounted to the PV modules, with the ballast and interconnected PV modules serving to collectively offset wind-generated forces. Further, one or more wind-deflecting fairings (or "wind deflectors") are assembled to some or all of the PV modules to reduce a magnitude of wind forces imparted upon an underside of the PV module and/or array.

The use of ballast to provide adequate PV module wind performance remains a necessary feature for non-penetrating PV module rooftop installations, especially for tilted PV arrangements. Because each installation site will have differing load constraints (e.g., load-carrying capacity of the roof, expected wind-related forces due to height, wind zone, and surrounding exposure of the building; etc.), the ability to adjust a weight of the ballast is beneficial. While efforts have been made to allow installers to adjust the mass or weight of ballast associated with an individual PV module, conventional designs require direct, on-site mounting of the ballast to the PV module frame, and thus entails a fairly labor intensive process. Further, the mounted ballast can create potentially damaging stresses in the PV module frame over time. Therefore, a need exists for a PV module assembly with improved ballast features.

SUMMARY

Some aspects in accordance with principles of the present disclosure relate to a photovoltaic (PV) module assembly including a PV module and a ballast tray. The PV module includes a PV device and a frame. The PV device provides a PV laminate that is assembled to the frame. Further, the frame includes an arm. The ballast is adapted for containing ballast and is removably associated with the PV module. In particular, the PV module assembly is configured to provide a ballasting state in which at least a portion of the tray is vertically under the PV laminate, and at least a portion of the tray is vertically over the arm. With this construction, then, the PV module assembly can be installed to a flat commercial rooftop, with both the PV module and the tray resting upon the rooftop. By positioning the ballast at least partially under the PV laminate, a resultant footprint of the PV module assembly is minimized. In the event the installed PV module is subjected to an upward force (e.g., wind gusts), upward displacement of the arm, and thus of the PV module, relative to the rooftop is impeded or prevented upon contact between the arm and the tray. In some embodiments, the ballasting state includes corresponding surfaces of the arm and the tray being spaced from one another by a spacing under normal (low or no wind) conditions and in contact with one another upon upward movement of the PV module; with these optional constructions, the PV module frame is not continuously subjected to a weight or mass of the tray (and ballast contained therein). In other embodiments, the arm includes an alignment tab configured to guide the tray to the ballasting state. In yet other embodiments, the tray and optionally the frame are entirely formed of plastic.

Yet other aspects in accordance with principles of the present disclosure relate to a PV module assembly for non-penetrating installation to a substantially flat surface. The assembly includes a PV module and a ballast tray. The PV module has a PV device and a frame. The PV device includes a PV laminate defining a perimeter, with framework of the frame encompassing the perimeter. Further, an arm is provided with the frame that projects from the framework in defining a lower face and an upper face. The lower face is adapted for placement on a substantially flat installation surface in supporting the PV laminate at a non-parallel angle relative to the flat surface. The upper face is provided opposite the lower face and forms an engagement surface. The tray is adapted to contain ballast and includes a floor for placement on the flat installation surface, as well as a stop surface opposite the floor. With this construction, non-penetrating installation of the PV module assembly to the flat installation surface includes the stop surface being located vertically over the engagement surface such that the tray impedes displacement of the arm upwardly from the flat installation surface.

Yet other aspects in accordance with principles of the present disclosure relate to a PV module assembly comprising a PV module and a ballast tray. The PV module includes a PV device and a frame. A PV laminate is provided with the PV device and is assembled to the frame. The frame further includes an arm. Finally, the tray is adapted to contain ballast. With this in mind, the PV module assembly is configured for non-penetrating installation to a substantially flat installation surface by placing the frame on the flat surface and removably placing the tray on the flat installation surface such that at least a portion of the tray is under the PV laminate and a portion of the tray is over the arm to impede movement of the arm upwardly from the flat installation surface.

Additional aspects in accordance with principles of the present disclosure relate to a method of installing a PV module array to a rooftop. The method includes providing a PV module including a PV device having a laminate assembled to a frame, with the frame including an arm. The PV module is placed on the rooftop such that the PV laminate is arranged at a non-parallel angle relative to the rooftop. A ballast tray containing ballast is positioned such that at least a portion of the tray is under the PV laminate and over the arm. Further, the tray is rested on the rooftop. Upon final installation, the tray impedes movement of the arm upwardly from the flat surface. In some embodiments, the method is characterized by the absence of using hand tools and/or physically affixing the tray to the frame.

BRIEF DESCRIPTION OF THE DRAWINGS

FIG. 3B is an interior perspective view of the frame portion of FIG. 3A;

FIG. 4A is a rear, top perspective view of a tray useful with the assembly of FIG. 1;

FIG. 4B is a rear, bottom perspective view of the tray of FIG. 4A;

FIG. 5B is a perspective view of the photovoltaic module assembly of FIG. 1;

DETAILED DESCRIPTION

Figure 1:
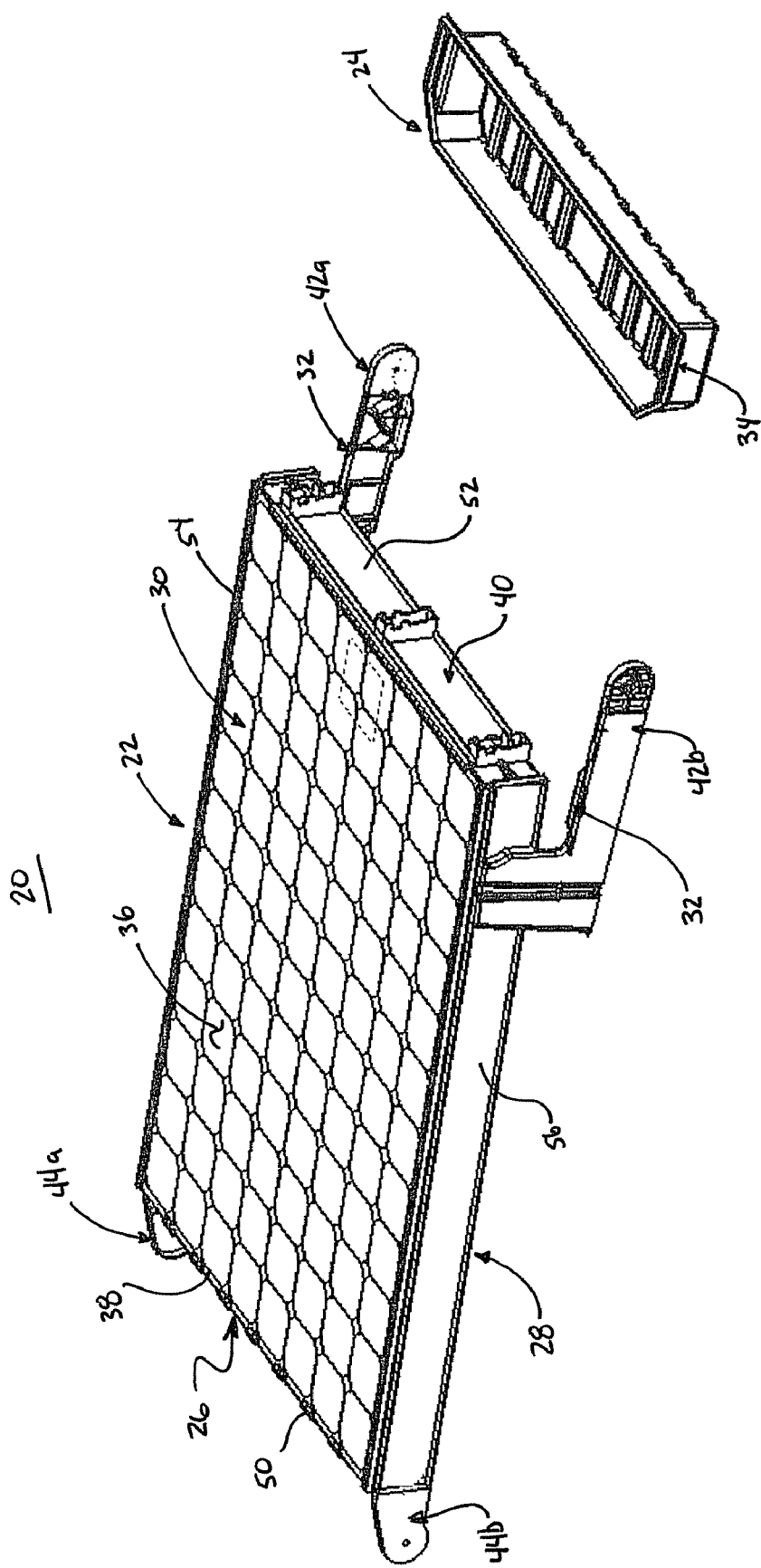
FIG. 1 is an exploded, perspective view of a PV module assembly in accordance with principles of the present disclosure.

One embodiment of a photovoltaic (PV) module assembly 20 in accordance with principles of the present disclosure is shown in FIG. 1. The PV module assembly 20 includes a PV module 22 and a ballast tray 24. Details on the various components are provided below. In general terms, however, the PV module 22 includes a PV device 26 (referenced generally) and a frame 28. A PV laminate 30 of the PV device 26 is encased by the frame 28, with the frame 28 providing one or more support faces that effectuate a tilted orientation of the PV laminate 30 relative to a flat installation surface (e.g., a flat rooftop). Further, the frame 28 provides at least one engagement surface 32 (referenced generally). The tray 24 is adapted to contain ballast (not shown), and is removably associated with the PV module 22, and in particular the frame 28. In this regard, the tray 24 and the frame 28 are configured such that in a ballasting state of the assembly 20, the tray 24 is at least partially disposed under the PV laminate 30 in a removable manner, and impedes overt movement of the PV module 22 (e.g., upward movement relative to an installation surface) via contact between a stop surface 34 (referenced generally) of the tray 24 and the engagement surface 32 of the frame 28. With this configuration, the PV module assembly 20 is highly useful for non-penetrating, commercial rooftop installations in which ballast for the PV module 22 may or may not be necessary, and where provided, the ballast imparts minimal point loading on the frame 28. Other installation sites, such as residential rooftop or ground mount applications, can also benefit from the PV module assembly of the present disclosure.

The PV module assembly 20 can assume a variety of forms that may or may not be implicated by FIG. 1. For example, the PV device 26, including the PV laminate 30, can have any form currently known or in the future developed that is otherwise appropriate for use as a solar photovoltaic device. In general terms, the PV laminate 30 consists of an array of photovoltaic cells. A glass laminate may be placed over the photovoltaic cells for environmental protection. In some embodiments, the photovoltaic cells advantageously comprise backside-contact cells, such as those of the type available from SunPower Corp., of San Jose, Calif. As a point of reference, in backside-contact cells, wirings leading to external electrical circuits are coupled on the backside of the cell (i.e., the side facing away from the sun upon installation) for increased area for solar collection. Backside-contact cells are also disclosed in U.S. Pat. Nos. 5,053,083 and 4,927,770, which are both incorporated herein by reference in their entirety. Other types of photovoltaic cells may also be used without detracting from the merits of the present disclosure. For example, the photovoltaic cells can incorporate thin film technology, such as silicon thin films, non-silicon devices (e.g., III-V cells including GaAs), etc. Thus, while not shown in the figures, in some embodiments, the PV device 26 can include one or more components in addition to the PV laminate 30, such as wiring or other electrical components.

Regardless of an exact construction, the PV laminate 30 can be described as defining a front face 36 and a perimeter 38 (referenced generally in FIG. 1). As a point of reference, additional components (where provided) of the PV device 26 are conventionally located at or along a back face of the PV laminate 30, with the back face being hidden in the view of FIG. 1.

Figure 2:
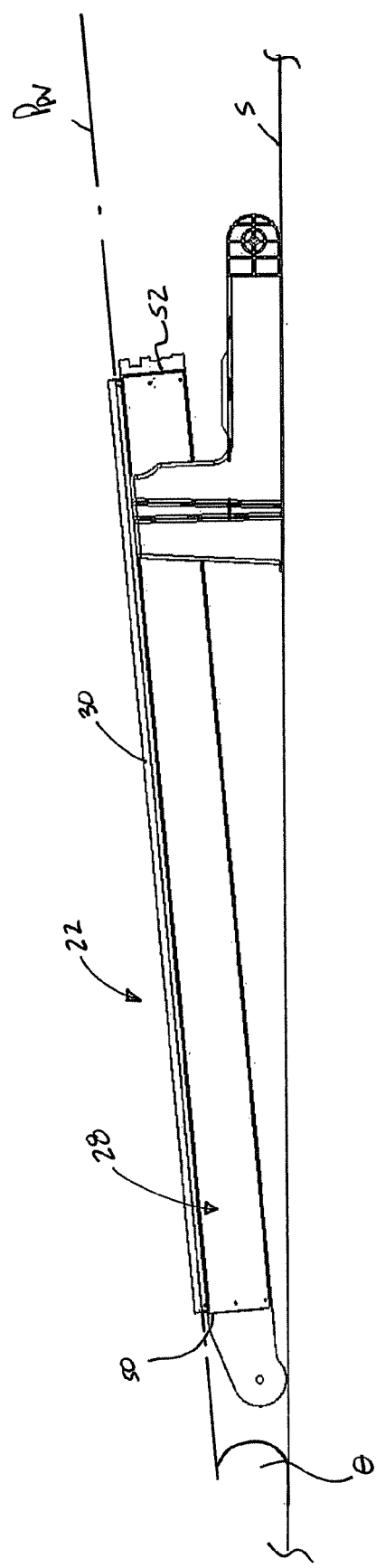
FIG. 2 is a side view of a photovoltaic module portion of the assembly of FIG. 1 mounted to an installation surface.

With the above understanding of the PV device 26, and in particular the PV laminate 30, in mind, the frame 28 generally includes framework 40 adapted to encompass the perimeter 38 of the PV laminate 30, along with at least one ballast arm 42 extending from the framework 40. For example, with the one embodiment of FIG. 1, the frame 28 includes first and second ballast arms 42a, 42b. Additional arms, such as coupling arms 44a, 44b can also be provided. As described below, the ballast arm(s) 42a, 42b can incorporate one or more features that facilitate desired interface with the tray 24 upon final installation, such as providing the engagement surface 32. In more general terms, however, the frame 28 is configured to facilitate arrangement of the PV laminate 30 at a tilted or sloped orientation relative to a substantially flat surface (e.g., maximum pitch of 2:12), such as a rooftop. For example, the framework 40 can be described as including or providing a leading side or leading frame member 50, a trailing side or trailing frame member 52, a first side or first side frame member 54, and second side or second side frame member 56. With these conventions in mind, FIG. 2 provides a simplified illustration of the PV module 22 relative to a flat, horizontal surface S. Though hidden in the view of FIG. 2, a location of the PV laminate 30 is generally indicated, as is a plane $P_{PV}$ of the PV laminate 30 that is otherwise established by the front face 36 (FIG. 1). Relative to the arrangement of FIG. 2, the frame 28 supports the PV laminate 30 relative to the flat surface S at a slope or tilt angle θ. The tilt angle θ can otherwise be defined as an included angle formed between the PV laminate plane $P_{PV}$ and a plane of the flat surface S. In some embodiments, the frame 28 is configured to support the PV laminate 30 at a tilt angle θ in the range of 1°-30°, in some embodiments in the range of 3°-7°, and yet other embodiments at 5°. As a point of reference, with tilted PV solar collection installations, the PV laminate 30 is desirably positioned so as to face or tilt southward (in northern hemisphere installations). Given this typical installation orientation, then, the leading frame member 50 can thus be generally referred to as a south frame member, and the trailing frame member 52 referred to as a north frame member. In other embodiments, however, the frame 28 can be configured to maintain the PV laminate 30 in a generally parallel relationship relative to the flat surface S.

Returning to FIG. 1, the framework 40 can assume a variety of forms appropriate for encasing the perimeter 38 of the PV laminate 30, as well as establishing the desired tilt angle θ (FIG. 2). In some embodiments, the frame members 50-56 are separately formed and subsequently assembled to one another and the PV laminate 30 in a manner generating a unitary structure upon final construction. Alternatively, other manufacturing techniques and/or components can be employed such that the framework 40 reflected in FIG. 1 is in no way limiting.

As mentioned above, the frame 28 includes at least one of the ballast arms 42a or 42b extending from the framework 40 to provide the engagement surface 32. While FIG. 1 reflects two of the ballast arms 42a, 42b, in other embodiments a greater or lesser number can be included. With respect to the one non-limiting example of FIG. 1, the ballast arms 42a, 42b are identical, defining mirror images upon final construction of the frame 28. With this in mind, the first ballast arm 42a is described in greater detail with reference to FIGS. 3A and 3B. In particular, the ballast arm 42a is formed as an extension of, or assembled to, the first side frame member 54, and includes a shoulder 60 and a foot 62. The shoulder 60 projects from the side frame member 54 (e.g., downwardly relative to the orientation of FIGS. 3A and 3B) at a point adjacent to, but spaced from, a trailing end 64 of the side frame member 54. Stated otherwise, and with reference to FIG. 1, the shoulder 60 is located along the first side frame 54 intermediate the leading and trailing frame members 50, 52, but more closely positioned to the trailing frame member 52. Returning to FIGS. 3A and 3B, the foot 62 extends from the shoulder 60, projecting longitudinally beyond (e.g., rearward) the trailing end 64 (and thus the trailing frame member 52 as shown in FIG. 1). The ballast arm 42a can have an L-like shape, with the shoulder 60 establishing a rear face 66 in extension from the side frame member 54, and the foot 62 establishing an upper face 68 in extension from the shoulder 60. Relative to a bottom 70 of the side frame member 54, then, the faces 66, 68 combine to define an open region 72 sized to receive a portion of the tray 24 (FIG. 1) as described below.

The engagement surface 32 mentioned above is defined as a portion or segment of the upper face 68. An entirety of the upper face 68 need not be configured to serve as the engagement surface 32, though can be in some embodiments. Optionally, an effective area of the engagement surface 32 can be enhanced by one or more fingers 76 formed as laterally-outward extensions of the upper face 68 (i.e., in a direction opposite the side frame member 54). For ease of explanation, then, the upper face 68 and the finger(s) 76 are collectively referenced as the engagement surface 32, it being understood that this represents but one example PV module-defined engagement surface contemplated by the present disclosure. In more general terms, the engagement surface(s) 32 formed by the PV module 22 to interface with the tray 24 (FIG. 1) may or may not be associated with the ballast arm(s) 42a, 42b as illustrated (i.e., can be defined elsewhere along the frame 28), and may or may not include the finger(s) 76.

In some embodiments, the ballast arm 42a further includes or forms an alignment tab 80 projecting from the upper face 68 in a region of the engagement surface 32. The alignment tab 80 can assume a variety of forms, and is generally sized in accordance with features of the tray 24 (FIG. 1) described below. The alignment tab 80 is generally constructed to guide the tray 24 into a desired position relative to the engagement surface 32. In fact, where the upper face 68 has an otherwise uniform construction, the alignment tab 80 effectively dictates which segment of the upper face 68 will serve as the engagement surface 32 (e.g., by positioning the tray 24 relative to the ballast arm 42a, the alignment tab 80 dictates what portion of the upper face 68 contacts the tray 24, with this so-contacting portion being the engagement surface 32). The alignment tab 80 can include tapered ends 82, 84, and terminates at a free end 86. The free end 86 is positioned within the open region 72, and defines a maximum height of the foot 62. Stated otherwise, relative to a lower face 88 of the foot 62, the free end 86 of the alignment tab 80 is above the engagement surface 32 and defines a tab height $H_T$ (best shown in FIG. 4D). The engagement surface 32 is located vertically below the free end 86, at a height $H_E$ (best shown in FIG. 4D). As a point of reference, the lower face 88 serves as a support face for the PV module 22, and is adapted for placement on a flat installation surface.

Figure 3A:
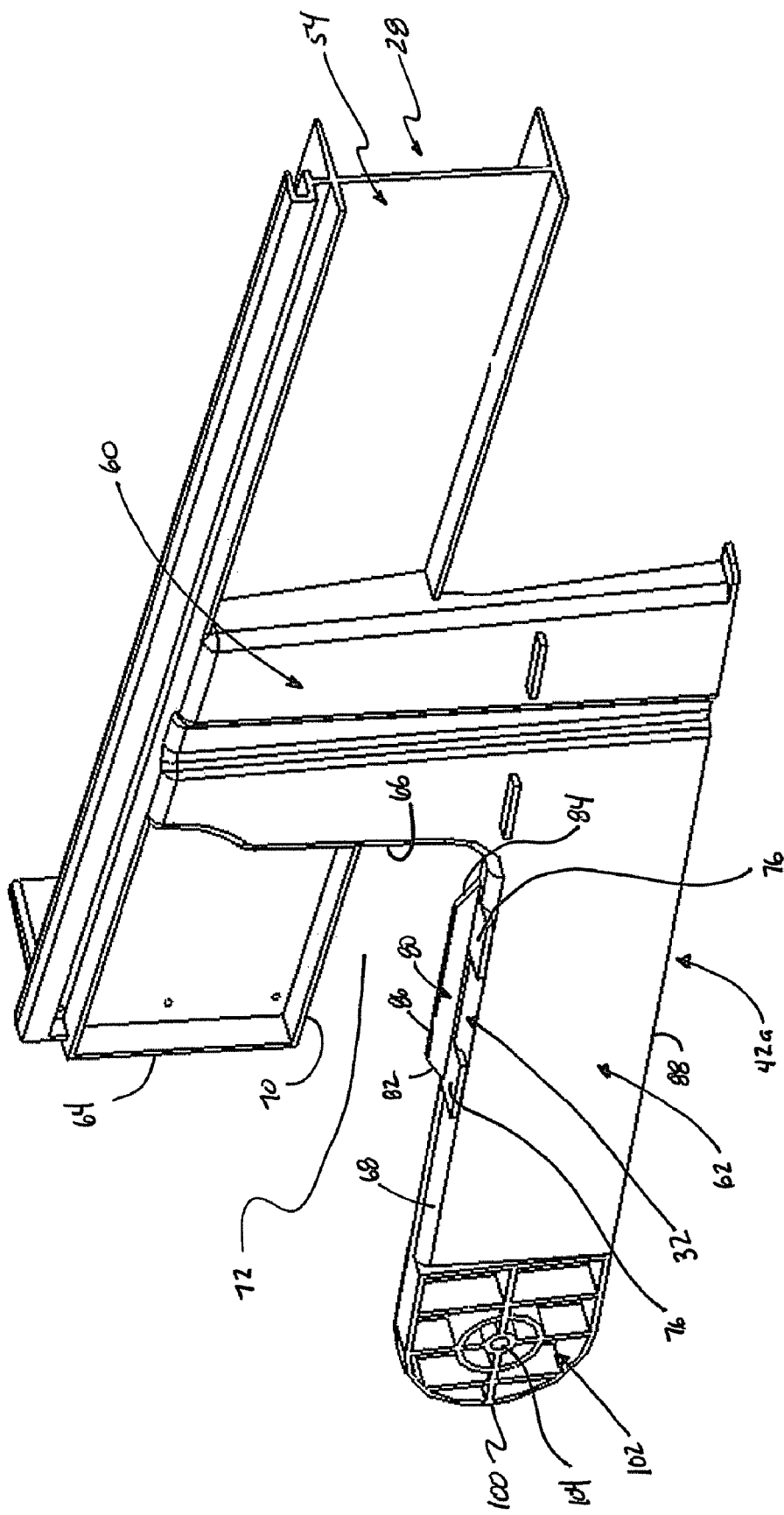
FIG. 3A is an exterior, perspective view of a portion of a frame useful with the photovoltaic module of FIG. 1.

As reflected in FIGS. 3A and 3B, the upper face 68 segment defining the engagement surface 32 as well as the optional alignment tab 80 are longitudinally positioned between the shoulder 60 and a terminating end 100 of the foot 62. In some embodiments, the foot 62 forms a mounting region 102 adjacent the terminating end 100. Where provided, the mounting region 102 is defined at a spatial location that is longitudinally spaced from the first side frame member 54 (and thus longitudinally spaced from the trailing frame member 52 upon final construction as shown in FIG. 1). More particularly, longitudinal extension of the foot 62 from the shoulder 60 spatially positions the mounting region 102 rearward of not only the first side frame member 54, but also the trailing frame member 52. Regardless, the mounting region 102 is adapted to promote mounting of the corresponding ballast arm 42 (e.g., the ballast arm 42a shown) to a similar component of a separate, identically-constructed PV module 22 in an end-to-end arrangement. For example, the mounting region 102 can include a laterally-extending bore 104. The alignment tab 80 (and thus the engagement surface 32) are located longitudinally away from the mounting region 102 for reasons made clear below.

In some embodiments, and as best shown in FIG. 3B, the foot 62 can include features that promote mounting of one or more additional PV module assembly components, such as a wind deflector (not shown). For example, the foot 62 can include or define a wind deflector mounting feature 110 having one or more slots 112. Alternatively, the wind deflector mounting feature 110 can assume a variety of different forms. Regardless, where provided, the engagement surface 32 and the alignment tab 80 are positioned longitudinally between the shoulder 60 and the wind deflecting mounting feature 110. Alternatively, the wind deflecting mounting feature 110 can be omitted.

Returning to FIG. 1, the ballast arm(s) 42 can have differing constructions from those described above, and can extend from, or be associated with, any portion of the framework 40, and need not necessarily serve to support the PV module 22 relative to an installation surface. In more general terms, then, the ballast arm(s) 42 provides the engagement surface 32 spatially positioned to selectively interface with the tray 24 upon final installation.

The tray 24 generally includes the stop surface(s) 34 for selectively interfacing with the engagement surface(s) 32. One construction of the tray 24 in accordance with principles of the present disclosure is shown in greater detail in FIGS. 4A and 4B. The tray 24 includes a floor 120, one or more side walls 122 (referenced generally), and a lip 124. The side walls 122 extend from the floor 120 to define a containment region 126 (FIG. 4A) within which various forms of ballast (not shown) can be maintained. The lip 124 extends from the side walls 122 opposite the floor 120, and defines the stop surface 34 (referenced generally) for interfacing with the frame 28 (FIG. 1) as described below.

The tray 24 is intended to be placed upon or rest against an installation surface (e.g., rooftop) when used in connection with the PV module assembly 20 (FIG. 1). With this in mind, the floor 120 defines an inner face 130 (FIG. 4A) and an outer face 132 (FIG. 4B), with the outer face 132 intended to be placed upon the installation surface. As best shown in FIG. 4B, the outer face 132 can form one or more slots 134 extending between, and open relative to, opposing ones of the side walls 122, for example the first and second lateral side walls 122a, 122b. With this construction, water or other liquid otherwise present at the installation site can readily flow under the floor 120 via the slot(s) 134. Alternatively, one or more of the slots 134 can extend between the opposing, first and second longitudinal side walls 122c, 122d. In yet other embodiments, the slots 134 can be omitted.

The side walls 122 project upwardly from the inner surface 130 of the floor 120, and thus collectively form a shape commensurate with a shape of the floor 120. For example, in some embodiments, a length of the first lateral side wall 122a can be less than a length of the second lateral side wall 122b, although other shapes are equally acceptable. Regardless, in some embodiments, one or more of the side walls 122 forms a drainage opening(s) 140. The drainage openings 140 extend through a thickness of the corresponding side wall 122, and permit drainage of water or other liquid from the containment region 126 to an exterior of the tray 24. For example, FIGS. 4A and 4B reflect the drainage openings 140 being formed in the lateral side walls 122a, 122b, and further that at least some of the drainage openings 140 optionally extend into the floor 120. Alternatively, or in addition, the drainage openings 140 can be formed in one or both of the longitudinal side walls 122c and/or 122d.

A height of the side walls 122 can be selected to facilitate placement of the tray 24 at least partially under the PV module 22 (FIG. 1) as described below. Balanced against this one desired attribute is forming the containment region 126 to have sufficient volume for containing a desired ballast (in terms of type, size and/or quantity). In some embodiments, a height of the side walls 122 is sized to maintain two stacked paver blocks. Along these same lines, other dimensional attributes of the tray 24 are selected in accordance with features of the PV module 22 (FIG. 1) while accommodating likely useful ballast items (e.g., paver blocks). For example, a maximum lateral width of the tray 24 (i.e., distance between the longitudinal side walls 122c, 122d) is slightly less than a distance between the ballast arms 42a, 42b (FIG. 1). Further, a maximum lateral length of the tray 24 (i.e., distance between the lateral side alls 122a, 122b) is slightly less than a longitudinal length of the foot 62 (FIG. 3A)). Alternatively, other dimensional attributes are also envisioned.

The lip 124 uniformly extends about a perimeter collectively defined by the side walls 122, and serves to enhance an overall stiffness of the tray 24. Alternatively, the lip 124 can be provided along only a portion of the side walls 122 (e.g., extending from one or both of the longitudinal side walls 122c, 122d). Regardless, the lip 124 is configured to provide one or more features that facilitate partial assembly of the tray 24 relative to the PV module 22 (FIG. 1), as well as to position the stop surface 34 at a desired, spatial location.

Figure 4C:
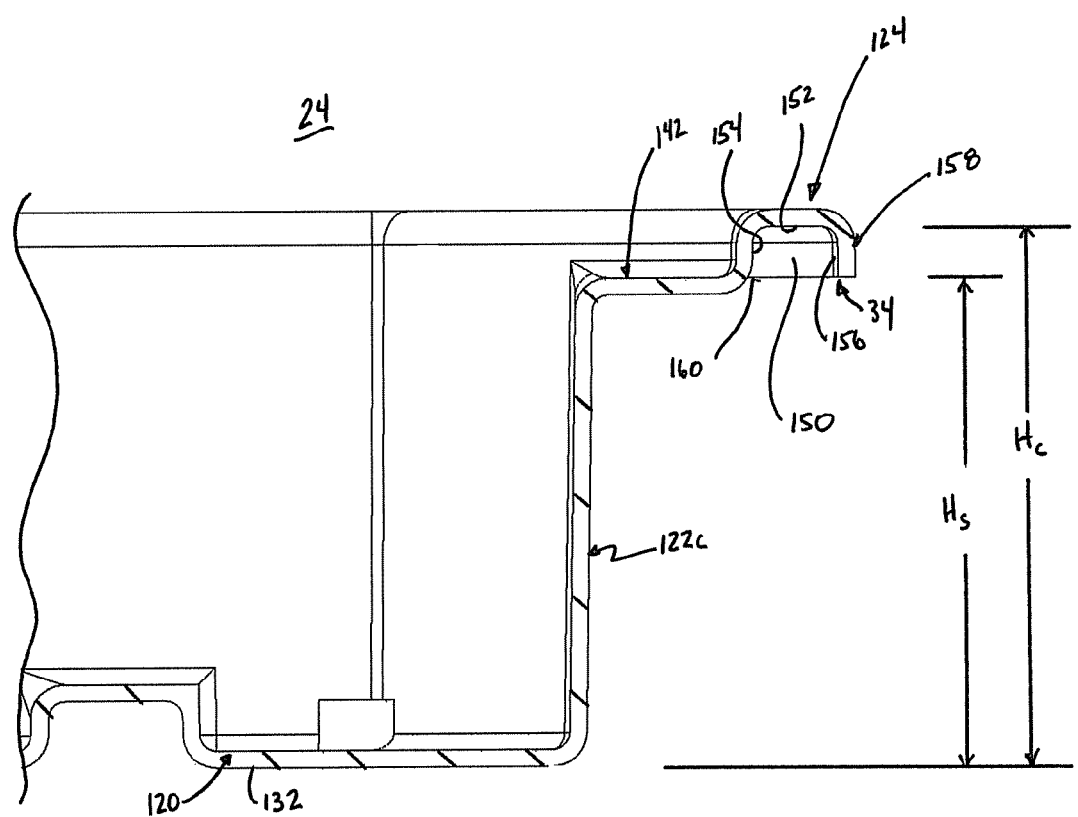
FIG. 4C is a cross-sectional view of a portion of the tray of FIG. 4A.

In particular, FIG. 4C illustrates features of the lip 124 in greater detail relative to the longitudinal side wall 122c. As a point of reference, FIG. 4C reflects the longitudinal side wall 122c as including an optional flange or handle segment 142 from which the lip 124 extends. The lip 124 forms a channel 150 defined by a closed end face 152, and opposing, first and second side faces 154, 156. The second side face 156 is formed by a lip wall 158 that further defines a lower face 160. As reflected in FIG. 4C, the stop surface 34 is defined by the lower face 160. To the extent the lip 124 is formed about an entirety of the tray perimeter (e.g., FIG. 4A), the stop surface 34 is alternatively characterized as being a portion or segment of the lower face 160. Stated otherwise, and akin to the above explanation of the engagement surface 32 (FIG. 1), an entirety of the lip 124 need not necessarily be adapted to serve as the stop surface 34 for impeding movement of the PV module 22 (FIG. 1) upon final installation. Instead, only those segment(s) of the lip lower face 160 positioned to interface with the engagement surface(s) 32 constitute the stop surface (s) 34 in some embodiments. Alternatively, the stop surface 34 can be provided elsewhere along the tray 24, and the lip 124 can be omitted.

With respect to the but one acceptable configuration of FIG. 4C, a width of the channel 150 is sized in accordance with (e.g., slightly greater than) a corresponding dimension of the alignment tab 80 (FIGS. 3A and 3B). Further, the tray 24 is configured to spatially locate a vertical position of the end face 152, as well as the stop surface 34, relative to the outer face 132 of the floor 120 in accordance with corresponding dimensions of the frame 28 (FIG. 1). In this regard, the tray 24 is constructed to locate the closed end face 152 of the channel at a predetermined height $H_C$ relative to the outer face 132 of the floor 120. Likewise, a predetermined height $H_S$ of the stop surface 34 relative to the outer surface 132 is also established.

A relationship between dimensions of the tray 24 and the frame 28 can be described with reference to FIG. 4D that otherwise illustrates a portion of the PV module assembly 20 in a ballasting state in which the tray 24 is positioned relative to the frame 28, and in particular, the ballast arm 42a, to limit overt movement of the frame 28. As shown, the frame 28, and in particular the lower face 88 of the ballast arm 42a, is placed upon, and is self-supporting relative to, a surface S (e.g., a rooftop). The tray 24 also rests upon the surface S via the outer face 132 of the floor 120. Thus, each of the PV module 22 and the tray 24 are independently self-supporting relative to the surface S.

Figure 4D:
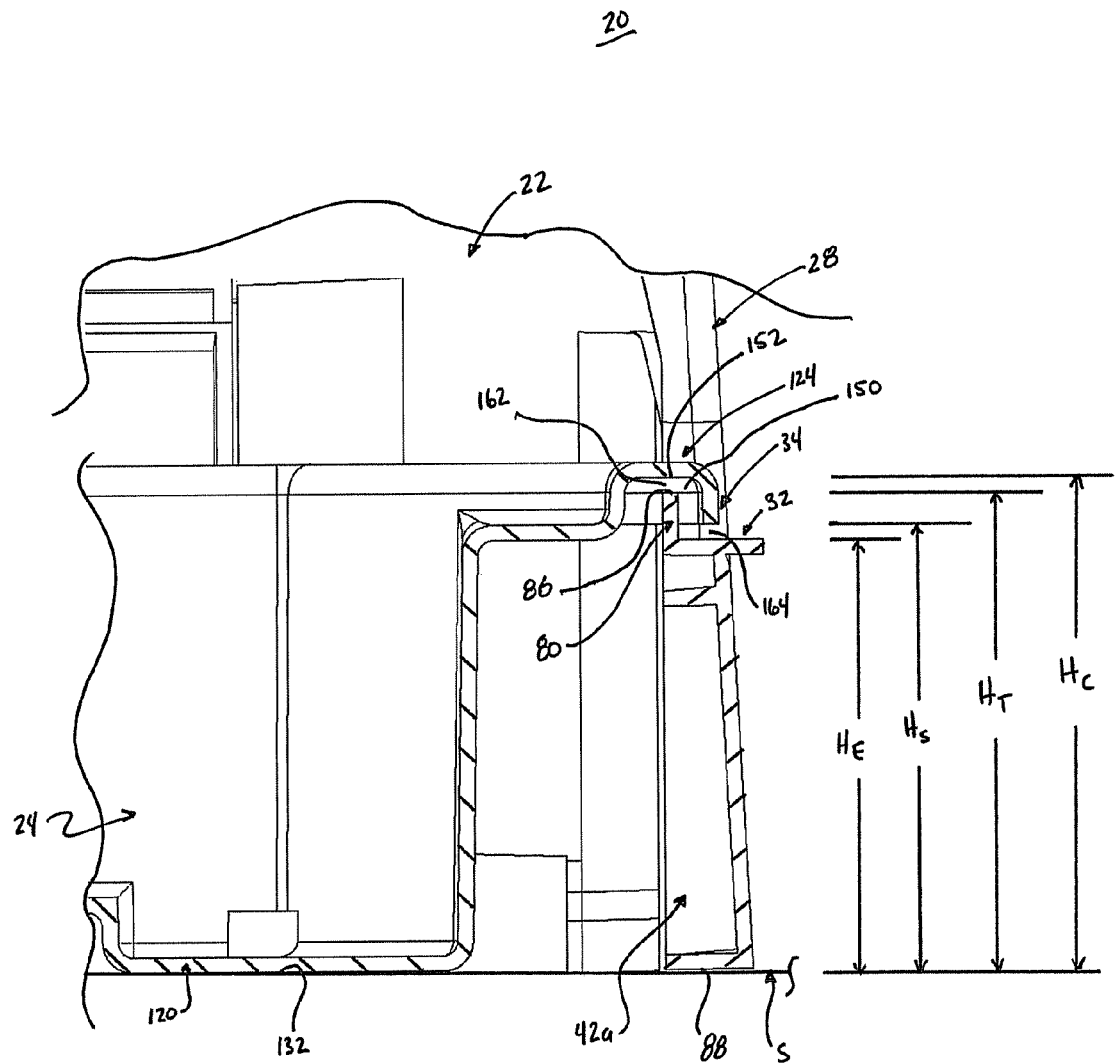
FIG. 4D is a cross-sectional view of a portion of the assembly of FIG. 1 in a ballasting state.

In the ballasting state of FIG. 4D, the alignment tab 80 extends within the channel 150, and the engagement surface 32 of the frame 28 is aligned with, but spaced from, the stop surface 34 of the tray 24. With this construction, then, the alignment tab 80 serves to generally guide the tray 24 to the ballasting state of FIG. 4D. Notably, however, the tray 24 and the frame 28 are not physically connected or otherwise affixed to one another.

For example, the tray 24 and the ballast arm 42a are dimensioned such that the free end 86 of the alignment tab 80 is vertically spaced from the end face 152 of the channel 150 by a spacing 162. The height $H_T$ of the alignment tab 80 (i.e., vertical dimension between the lower face 88 and the free end 86) is less than the vertical height $H_C$ of the channel 150 (i.e., vertical dimension between the outer face 132 of the floor 120 and the end face 152 of the channel 150). Similarly, a spacing 164 is established between the engagement surface 32 and the stop surface 34. The height HE of the engagement surface 32 of the frame 28 (i.e., vertical distance between the lower face 88 and the engagement surface 32) is less than the vertical height $H_S$ of the stop surface 34 of the tray 24 (i.e., vertical distance between the outer face 132 of the floor 120 and the stop surface 34). By providing the spacings 162, 164, the tray 24 (and any ballast maintained thereby) does not apply a force onto the frame 28 under normal conditions (i.e., where the PV module 22 is otherwise self-sustained in the orientation of FIG. 4D relative to the surface S and not subjected to a lifting force of sufficient magnitude to overcome a mass of the PV module 22). Unlike conventional designs in which the applied ballast continuously "hangs" from the PV module, the PV module assembly 20 of the present disclosure avoids long-term application of ballast-related forces or stresses upon the frame 28. However, in the event the PV module 22 is subjected to a force otherwise sufficient to lift the PV module 22 upwardly from the surface S, the engagement surface 32 of the ballast arm 42a is brought into contact or abutment with the stop surface 34 of the tray 24, with the ballast carried by the tray 24 offsetting the lifting force, thereby impeding overt displacement of the PV module 22 from the surface S.

As reflected in FIG. 4D, in the installed, ballasting state, while the tray 24 is disposed within the open region 72, only a minimal volume of the open region 72 is affected. That is to say, the lip 124 occupies a minor portion of the open region 72. As a result, the open region 72 is available to accommodate passage of other components of the PV module 22, such as wires/cabling (not shown). This optional feature finds marked usefulness in instances where the PV module assembly 20 is utilized as part of a module array, and wires/cabling desirably extends between two PV modules arranged side-by-side, and can be disposed within the open region 72 (and possibly supported by the tray 24).

Figure 5A:
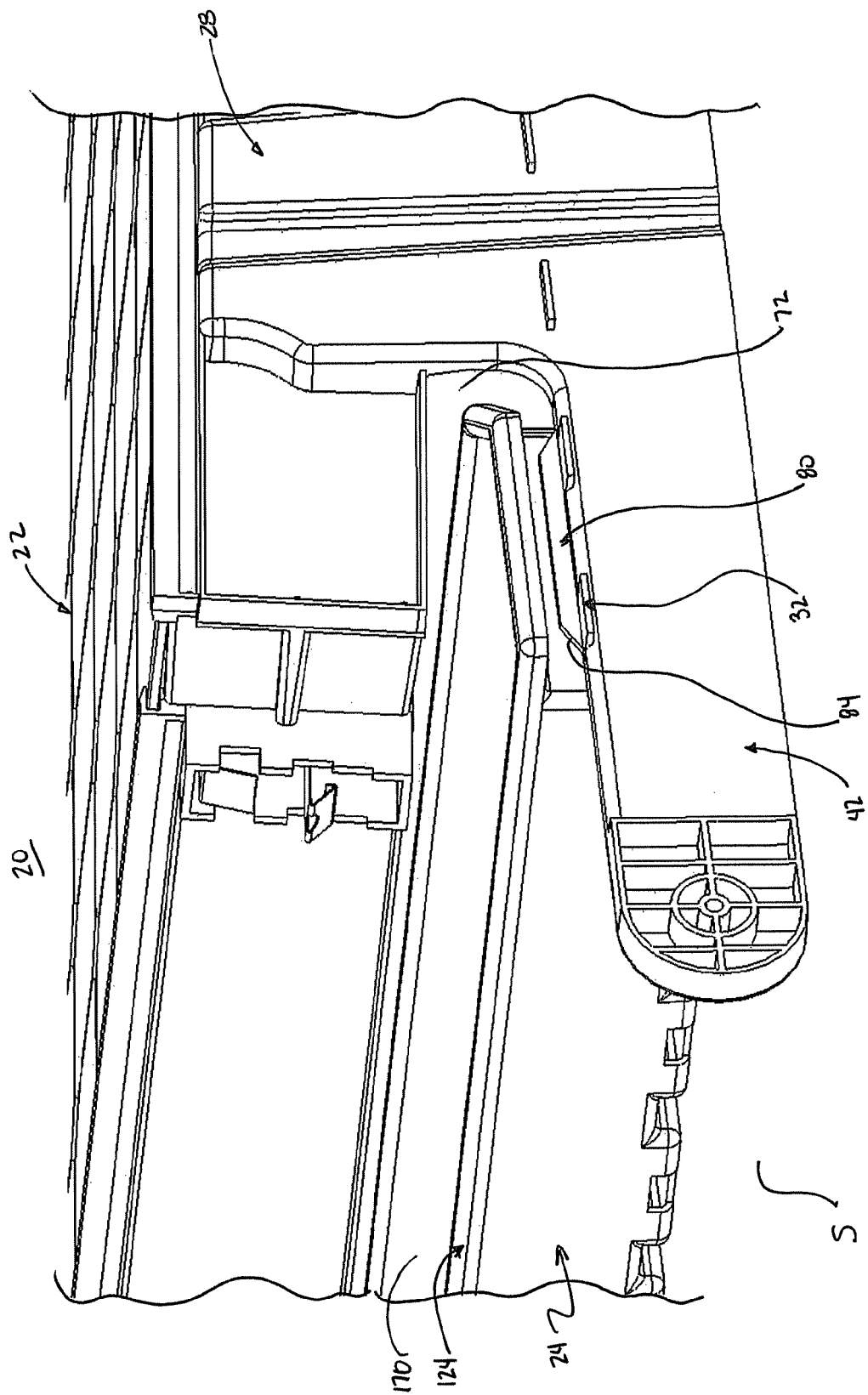
FIG. 5A is a perspective view of a portion of the photovoltaic module assembly of FIG. 1 in a partially-installed state.

The unaffixed relationship between the PV module 22 and the tray 24 in the ballasting state not only eliminates application of undesirable ballast-related stresses onto the frame 28, but also facilitates simple, straightforward installation of the PV module assembly 20. For example, partial assembly of the tray 24 to the PV module 22 to (or from) the ballasting state is generally reflected in FIG. 5A. More particularly, following placement of the PV module 22 at a desired location (e.g., rooftop), the tray 24 is loaded with a desired ballast 170 (e.g., paver block(s), rocks, gravel, etc.). The installer then inserts the tray 24 relative to the frame 28. For example, the tray 24 can be placed on the surface S adjacent (rearward of) the ballast arms 42, and then slid along the surfaces, bringing the tray 24 into the open region 72. Movement of the tray 24 continues until the alignment tab 80 is captured within the channel 150 (FIG. 4C) of the lip 124 as previously described. In this regard, the tapered end 84 of the alignment tab 80 can assist in guiding the lip 124 into a desired position. Alternatively, or in addition, the tray 24 can be slightly lifted relative to the installation surface S, and then placed over the engagement surface 32 as shown. Regardless, arrangement of the PV module assembly 20 to the ballasting state does not require use of any tools or other coupling or mounting components. Instead, the tray 24 is quickly and easily maneuvered by hand to (and from) the ballasting state.

FIG. 5B provides a more complete illustration of the PV module assembly 20 in the ballasting state in accordance with some embodiments. The tray 24 extends between the ballast arms 42a, 42b in the manner previously described. With this construction, the tray 24 serves to impede overt movement of both of the ballast arms 42a, 42b (i.e., each of the ballast arms 42a, 42b provides the engagement surface 32 described above, with tray 24 having corresponding stop surfaces 34 (FIG. 4C)). Further, at least a portion, and in some embodiments an entirety, of the tray 24 is positioned beneath or vertically under the PV laminate 30 and/or corresponding components of the framework 40 (e.g., the trailing frame member 52). With this arrangement, an open space 172 remains between the ballast arms 42a, 42b, and is not otherwise occupied by the tray 24. The space 172 provides a convenient region or walkway when the PV module assembly 20 is provided as part of a PV module array. Further, the relatively open nature of the containment region 126 (FIG. 4A) provided with the tray 24 affords the installation personnel the ability to independently determine the amount or mass of the ballast 170 otherwise included with each individual tray 24. Conversely, the ballast tray 24 can be removed from the installation site (or not otherwise initially associated with the PV module 22). This represents another optional feature in accordance with the present disclosure whereby installers can selectively decide whether or not each individual PV module of an intended array does or does not require ballast. For example, relative to an array having a multiplicity of the PV modules 22, ballasting "adjustments" can be made with respect to each individual PV module 22. Trays 24 can be provided for some of the PV modules, and the ballast mass/weight contained thereby selected as desired; for others of the PV modules 22, the trays 24 are not provided.

Figure 5C:
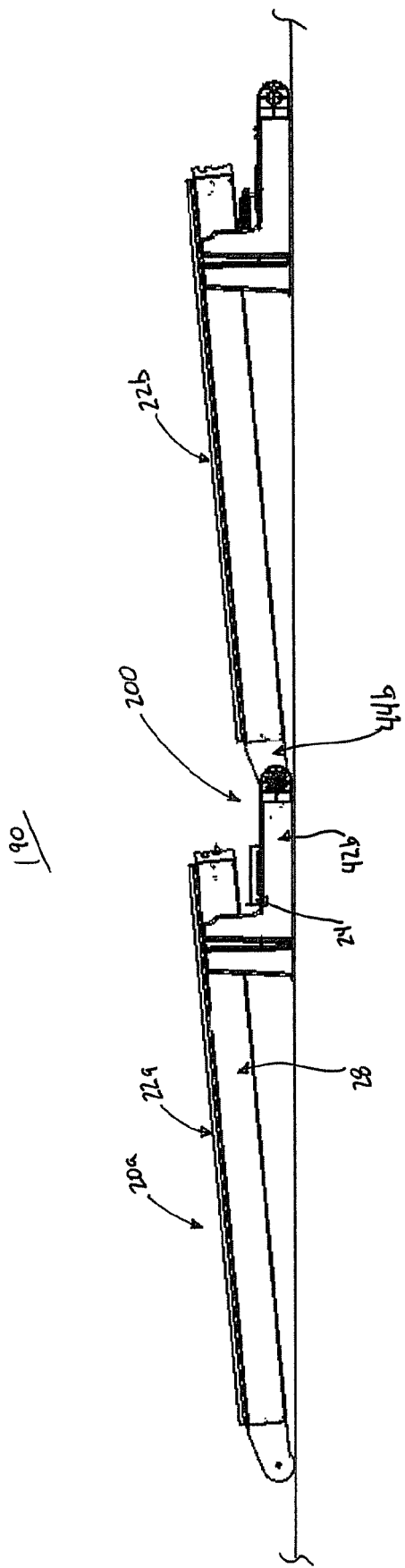
FIG. 5C is a side view of a photovoltaic module array including the assembly of FIG. 1.

Along these same lines, portions of an exemplary PV module array 190 is shown in FIG. 5C and includes first and second PV modules 22a, 22b mounted to one another in an end-to-end arrangement. In this regard, a first PV module 22a is provided as part of a PV module assembly 20a in accordance with the present disclosure, and thus includes the tray 24 (partially hidden in the view of FIG. 5C) removably associated with the frame 28 as previously described. Positioning of the tray 24 relative to the first PV module 22a (partially or entirely beneath the PV laminate 30) is such that the tray 24 does not obstruct coupling between the ballast arm 42b of the first PV module 22a and the coupling arm 44b of the second PV module 22b as shown. Further, a walkway 200 (referenced generally) between the PV modules 22a, 22b remains open (i.e., not obstructed by the tray 24), thereby allowing installation personnel to freely move along the array 190.

Figure 6:
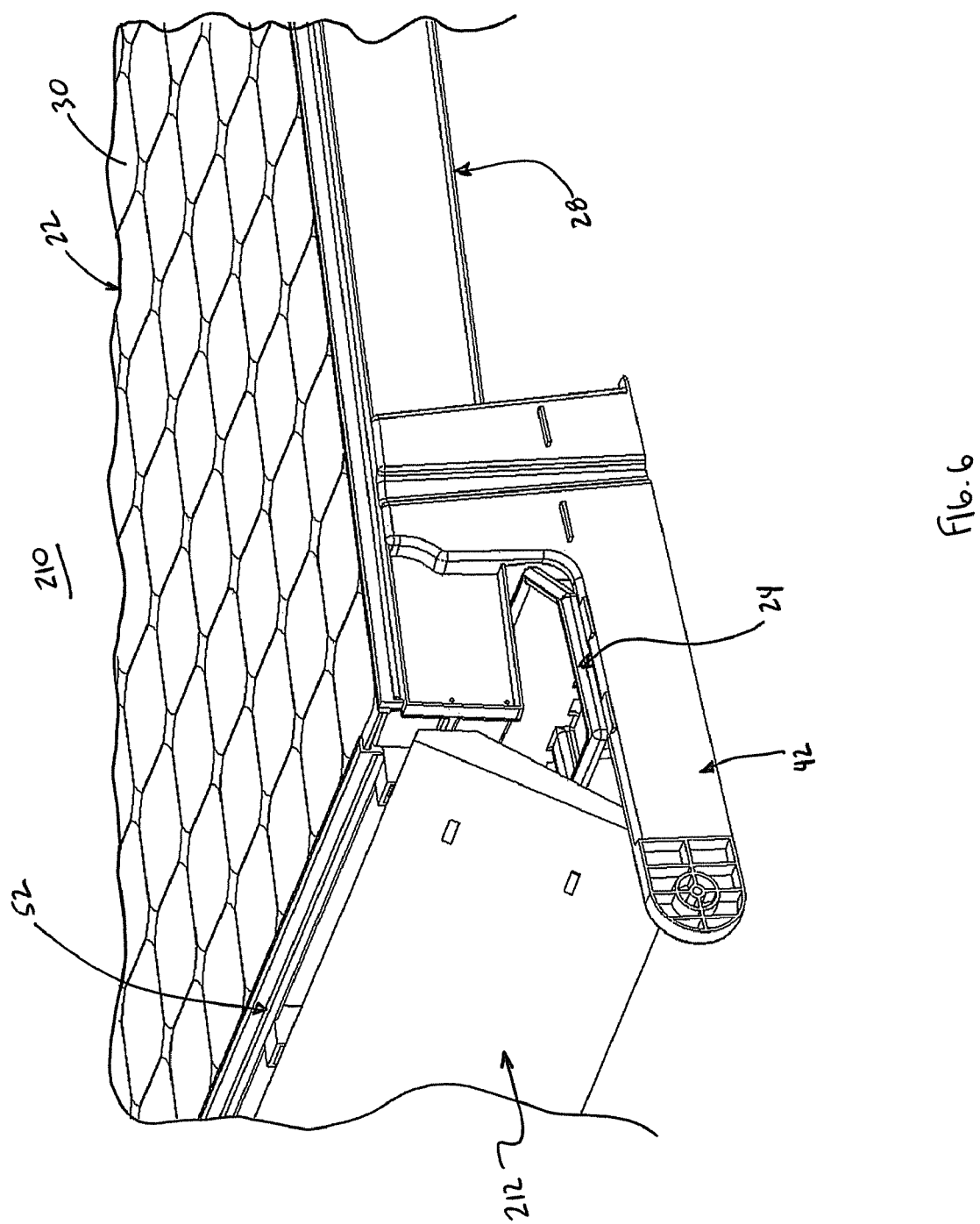
FIG. 6 is a perspective view of a portion of an alternative photovoltaic module assembly in accordance with principles of the present disclosure.

In addition to promoting mounting between PV modules of a PV module array, the PV module assembly 20 (FIG. 1) of the present disclosure optionally facilitates or permits mounting of one or more additional, separate components to the frame 28. For example, FIG. 6 illustrates another embodiment PV module assembly 210 in accordance with the present disclosure. The assembly 210 is highly akin to the assembly 20 previously described, and includes the PV module 22 and the ballast tray 24. In addition, a wind deflector 212 is provided, and is mounted to the frame 28. The wind deflector 212 can be coupled to the trailing frame member 52 and the ballast arms 42, for example via the wind deflector mounting feature 110 (FIG. 3B) previously described. Regardless, a location of the tray 24 in the ballasting state of FIG. 6 is such that the wind deflector 212 is coupled to the frame 28 as desired, with the tray 24 being spaced away from the wind deflector 212. Notably, the tray 24 is not physically mounted to, or provided as part of, the wind deflector 212 with the example construction of FIG. 6.

Returning to FIG. 1, the tray 24 can be formed from various materials exhibiting appropriate strength and stiffness. In some embodiments, the tray 24 is formed entirely of plastic or polymeric material(s). For example, the tray 24 can be a molded polymeric component, such as injection molded PPO/PS (Polyphenylene Oxide co-polymer/polystyrene blend) or PET (Polyethylene Terephthalate), although other polymeric or electrically insulated materials are also acceptable. With these constructions, then, use of the optional non-conductive plastic tray 24 as part of the PV module assembly 20 does not require additional grounding components (or related installation procedures). In a related embodiment, the frame 28 is similarly formed of a plastic or polymeric material(s), again obviating the need for electrically grounding the PV module assembly 20. Alternatively, however, one or both of the tray 24 and/or the frame 28 can be partially or entirely formed of metal. Notably, where at least the frame 28 is partially or entirely plastic, features of the present disclosure by which the tray 24 is not physically mounted to the frame 28 (or otherwise does not bear against the frame 28) in the ballasting state greatly enhances long-term integrity of the frame 28. The plastic frame 28 will not experience creep over time (as would otherwise occur with conventional ballast-mounting PV module designs), a common concern associated with plastic parts subjected to large stresses.

The PV module assembly of the present disclosure provides a marked improvement over previous designs. The tray is quickly easily installed relative to the PV module without requiring tools. Further, long-term, stress-induced damage of the PV module is avoided, while still providing highly adequate wind performance. Presence of the tray has minimal impact on an overall footprint of the assembly, and with optional plastic constructions, additional grounding components and installation procedures are not necessary.

Although the present disclosure has been described with reference to preferred embodiments, workers skilled in the art will recognize that changes can be made in form and detail without departing from the spirit and scope of the present disclosure.

What is claimed is:

1. A photovoltaic module assembly comprising:
a photovoltaic module including:
a photovoltaic device including a photovoltaic laminate;
a frame assembled to the photovoltaic laminate, the frame including a first arm; and
a ballast tray for containing ballast wherein, upon installation of the photovoltaic module assembly, the ballast tray is removably associated with the photovoltaic module;
wherein the photovoltaic module assembly is configured to provide a ballasting state in which at least a portion of the tray is vertically under the photovoltaic laminate and at least a portion of the tray is vertically over the first arm to impede overt displacement of the photovoltaic module; and
wherein the ballasting state includes the tray being unaffixed to the frame.

2. A photovoltaic module assembly comprising:
a photovoltaic module including:
a photovoltaic device including a photovoltaic laminate;
a frame assembled to the photovoltaic laminate, the frame including a first arm; and
a ballast tray for containing ballast wherein, upon installation of the photovoltaic module assembly, the ballast tray is removably associated with the photovoltaic module;
wherein the photovoltaic module assembly is configured to provide a ballasting state in which at least a portion of the tray is vertically under the photovoltaic laminate and at least a portion of the tray is vertically over the first arm to impede overt displacement of the photovoltaic module; and
wherein the assembly is configured such that the tray is manually removable from the ballasting state without tools.

3. The assembly of claim 2, wherein the assembly is configured such that when the frame is placed on a flat surface, the ballasting state includes the tray resting on the flat surface.

4. The assembly of claim 3, wherein the frame is configured to orient a major plane of the photovoltaic laminate at non-parallel angle relative to the flat surface.

5. The assembly of claim 2, wherein the first arm forms an alignment tab for guiding the tray to the ballasting state.

6. The assembly of claim 5, wherein the tray includes a floor, at least one side wall extending from the floor, and a lip projecting from the side wall opposite the floor and forming a channel sized to receive the alignment tab in the ballasting state.

7. The assembly of claim 6, wherein the channel is defined by closed end face, and the alignment tab terminates at a free end, and further wherein the ballasting state includes a spacing being formed between the end face and the free end.

8. The assembly of claim 7, wherein the first arm includes a lower face adapted for placement against a flat surface with the free end positioned opposite the lower face, and further wherein the floor defines an outer face for placement against the flat surface, and even further wherein a vertical distance between the lower face and the free end is less than a vertical distance between the outer face of the floor and the closed end of the channel.

9. The assembly of claim 2, wherein the photovoltaic laminate defines a perimeter and the frame includes framework encompassing the perimeter, and further wherein the first arm projects from the framework to define an open region, the ballasting state including a portion of the tray disposed within the open region.

10. The assembly of claim 9, wherein the framework includes a leading frame member, a trailing frame member, and opposing, first and side frame members, and further wherein the first arm includes a shoulder extending from the first side frame member and a foot extending from the shoulder to an end positioned longitudinally beyond the trailing frame member in a direction opposite the leading frame member, even further wherein the ballasting state includes a portion of the tray positioned over the foot.

11. The assembly of claim 10, wherein the frame further includes a second arm having a shoulder extending from the second side frame member and a foot extending to an end and positioned longitudinally beyond the trailing frame member in a direction opposite the leading frame member in a direction opposite the leading frame member, and further wherein the ballasting state includes the tray located between the arms and a portion of the tray being positioned over the foot of the second arm.

12. The assembly of claim 11, wherein each of the first and second arms forms an alignment tab for guiding the tray to the ballasting state.

13. The assembly of claim 10, wherein the first arm forms a mounting region adapted for mounting to a second photovoltaic module, and further wherein the ballasting state includes an entirety of the tray being spaced from the mounting region.

14. The assembly of claim 2, wherein the tray includes a floor and a plurality of side walls extending from the floor to define a containment region, and further wherein an opening is formed in at least one of the side walls for draining liquid from the containment region.

15. The assembly of claim 2, wherein the tray includes a floor defining an inner face and an outer face, and a plurality of side walls extending from the floor to define a containment region relative to the inner face, and further wherein the outer face forms at least one slot for permitting passage of liquid along the outer face.

16. The assembly of claim 2, wherein the tray is formed of plastic.

17. The assembly of claim 16, wherein the frame is formed of plastic.

18. The assembly of claim 2, further comprising:
a wind deflector provided apart from the tray and connectable to the frame.

19. A photovoltaic module assembly for non-penetrating installation to a substantially flat surface, the assembly comprising:
a photovoltaic module including:
a photovoltaic device including a photovoltaic laminate defining a perimeter;
a frame including framework encompassing the perimeter and an arm projecting from the framework, the arm defining a lower face for placement on a flat surface in supporting the photovoltaic laminate at a non-parallel angle relative to the substantially flat surface, and an engagement surface opposite the lower surface; and
a ballast tray for containing ballast, the tray including a floor for placement on the substantially flat surface and a stop surface opposite the floor, wherein, upon installation of the photovoltaic module assembly, the ballast tray is removably associated with the photovoltaic module;
wherein non-penetrating installation of the assembly to the flat surface includes the stop surface of the tray located vertically over the engagement surface of the arm such that the arm impedes displacement of the arm upwardly from the substantially flat surface; and
wherein the assembly is characterized by the absence of a coupling component affixing the tray to the frame.

20. The assembly of claim 19, wherein the frame and the tray are entirely formed of plastic.

21. A method of installing a photovoltaic module array to a rooftop, the method comprising:
providing a first photovoltaic module including a photovoltaic device including a photovoltaic laminate and a frame assembled to the photovoltaic laminate and including an arm;
placing the first photovoltaic module on the rooftop, including the photovoltaic laminate arranged in a non-parallel angle relative to the rooftop;
providing a ballast tray containing ballast;
positioning at least a portion of the ballast tray under the photovoltaic laminate and over the arm; and
resting the tray on the rooftop;
wherein upon final installation, the ballast tray impedes movement of the arm upwardly from the rooftop and is removably associated with the photovoltaic module; and
wherein the method is characterized by the absence of manipulating a coupling device to directly mount the tray to the frame.

22. The method of claim 21, wherein positioning the tray includes sliding the tray over the arm.

23. The method of claim 21, wherein the tray defines a stop surface and the arm defines an engagement surface, and further wherein positioning the tray includes arranging the stop surface of the tray to abut the engagement surface of the arm upon upward movement of the arm relative to the flat surface.

24. The method of claim 23, wherein arranging the surfaces includes establishing a spacing between the stop surface and the engagement surface in the absence of upward movement of the arm relative to the flat surface.

25. The method of claim 21, further comprising:
mounting a second photovoltaic module to the arm of the first photovoltaic module following the step of resting the tray on the rooftop.

* * * * *